United States Patent [19]
Ohmi et al.

[11] Patent Number: 5,545,868
[45] Date of Patent: Aug. 13, 1996

[54] SUPERHIGH PURITY FLUID SUPPLY PIPE SYSTEM AND METHOD OF INSTALLING THE SAME

[75] Inventors: Tadahiro Ohmi, 1-17-301, Komegabukuro 2-chome, Aoba-ku, Sendai-shi, Miyagi-ken; Masakazu Nakamura, Miyagi-ken, both of Japan

[73] Assignee: Tadahiro Ohmi, Miyagi-ken, Japan

[21] Appl. No.: 244,127

[22] PCT Filed: Nov. 20, 1992

[86] PCT No.: PCT/JP92/01522

§ 371 Date: May 19, 1994

§ 102(e) Date: May 19, 1994

[87] PCT Pub. No.: WO93/09906

PCT Pub. Date: May 27, 1993

[30] Foreign Application Priority Data

Nov. 20, 1991 [JP] Japan .................. 3-331351

[51] Int. Cl.$^6$ .................................................. B23K 9/00
[52] U.S. Cl. .......................... 219/61; 219/137 R; 228/201
[58] Field of Search .......................... 219/61, 60 R, 219/74, 75, 137 R; 228/199, 201, 202

[56] References Cited

U.S. PATENT DOCUMENTS 2,905,805 9/1959 McElrath et al. .................. 219/74

FOREIGN PATENT DOCUMENTS 61-273257 12/1986 Japan .................. 219/61
62-101381 5/1987 Japan .

Primary Examiner—Clifford C. Shaw
Attorney, Agent, or Firm—Baker & Daniels

[57] ABSTRACT

A superpure purity gas supply system adapted to prevent a semiconductor device of high cleanliness, into which a gas is introduced through a gas supply pipe system, from being contaminated with the metal s or the like deposited during the welding thereof, and a method of installing such a gas supply pipe system. The superhigh purity gas supply system according to the present invention is a pipe system consisting of gas supply pipe system parts welded portions, characterized in that the gas supply pipe system parts having such welded portions are washed with super high purity water before, during or after the installation of the pipe system. The invention also provides a method of super high purity gas supply pipe system having welded portions, characterized in that pipe system members are welded as an inert gas or a back seal gas is being introduced into at least these members, superhigh purity water being introduced into the welded members after the welding of these members so as to wash out the metal fume deposited on the inner surfaces of the welded members during the welding thereof.

18 Claims, 7 Drawing Sheets

# SUPERHIGH PURITY FLUID SUPPLY PIPE SYSTEM AND METHOD OF INSTALLING THE SAME

TECHNICAL FIELD

The present invention relates to an installation for a super high purity fluid supply pipe system, and in greater detail, relates to a super high purity fluid supply pipe system, and an installation method therefor, which is capable of removing impurities such as metal and the like deposited as a result of welding, and is capable of preventing the contamination with trace amounts of metals or the like of highly clean semiconductor manufacturing apparatuses and the like into which gas or a fluid, such as pure water or chemicals, is introduced through fluid supply piping.

BACKGROUND OF THE INVENTION

Tungsten inert gas welding, arc gas welding, electron beam welding, and the like, are widely employed in the joining of fluid supply system pipes having welded portions, gas parts, or wetted parts. In such conventional welding technologies, no consideration was given to the burning of the weld surface, the surface roughness of the welded portion, or the deposition of metal fumes generated from the fused portion, and it was determined that corrosion and metal contamination occurred with respect to extremely active special material gasses. Furthermore, with respect to inert common gasses, as well, though actual problems do not occur over short periods of time, it is thought that there are likely to be reliability problems over a longer period of time.

Using FIG. 7 below, the deposition of metal fumes, the surface roughness of the welded portion, and the deposition of chrome carbides on the surface in accordance with the conventional method of installation for fluid supply pipe systems will be explained in greater detail. FIG. 7 shows a welded portion of pipe materials welded by means of tungsten inert gas welding. In the Figure, reference 701 indicates a tungsten electrode, and reference 702 indicates pipe materials which are subjected to welding. Reference 703 indicates a welded portion, while reference 704 indicates metal fumes which are generated at the fused portion thereof. These metal fumes 704 are deposited on to the surface of the pipe material 702 at the downstream side of the welded portion 703 as a result of the arc gas or back-seal gas flow, and become deposited metals 705. These deposited metals 705 do not pose the problem of separation with respect to inert gasses; however, under the flow of a corrosive gas, for example, hydrogen chloride gas, the deposited metals 705 adhering to the surface separate, and contaminate the gas atmosphere. The metals which separate have been detected to be Fe, Ni, Cr, and Mn, which are chiefly contained in the metal materials. These impurities have a great adverse effect on LSI characteristics, so that they pose a serious problem in semiconductor manufacture.

The present invention was created in light of the above circumstances; it has as an object thereof to provide a super high purity fluid supply system, and an installation method therefor, which is capable, during installation of a super high purity gas supply system, of removing metals deposited in the vicinity of the surface of the welded portion and on interior portions of the fluid supply system, and preventing in advance the contamination of, for example, a semiconductor manufacturing apparatus or the like, into which a gas, pure water, or chemicals are introduced through this fluid supply system.

SUMMARY OF THE INVENTION

A first essential feature of the present invention resides in an installation method for a super high purity fluid supply pipe system, characterized in that, in an installation system for a super high purity fluid supply pipe system possessing welded portions, members to be welded are welded as an inert gas or a back seal gas is being introduced into at least the interior of these members to be welded, super high purity water is caused to flow through the welded members after the welding thereof, and the metal fumes adhering to the interior of the welded members as the result of welding are washed out by the super high purity water.

A second essential feature of the present invention resides in a super high purity water supply pipe system comprising fluid supply pipe system parts having welded portions, characterized in that either prior to the construction, during the construction, or after the construction of the super high purity fluid supply pipe system, the fluid supply pipe system parts having welded portions are washed using super high purity water.

FUNCTION AND EMBODIMENT EXAMPLES

Hereinbelow, the function of the present invention will be explained together with the embodiment examples.

First, the experimentation conducted in the course of arriving at the present invention will be explained. The attached metals present on post-welded surfaces of stainless steel subjected to electrolytic polishing and stainless steel, the surfaces whereof were subjected to passivation processing, were removed using super high purity water. A profile of the composition in the direction of depth of the stainless steel surface prior to welding, obtained by means of XPS, is shown in FIG. 2. In FIG. 2(a) shows an SUS316L surface which has been electrolytically polished, while (b) shows an electrolytically polished SUS316L surface which has been subjected to oxide passivation processing.

In FIG. 3, the composition profile in the direction of depth of the surface of each welded portion after welding, as obtained by XPS, is shown. FIG. 3(a) shows an electrolytically polished SIU 316L surface, while FIG. 3(b) shows an electrolytically polished SIU316L surface which has been subjected to oxide passivation processing. In the region from the outermost layer of the surface after welding to a depth of approximately 15–20 Å, an increase in Mn, which has a comparatively low melting point and a high vapor pressure, was observed. From these results, it can be seen that there is a change in the normal surface composition profile as a result of fusion and metal deposition caused by the conducting of welding.

In FIG. 4, the relationship between deposited metals in the vicinity of the welded portion of the stainless steel pipe members and distance from the welded portion is shown. Welding is conducted while causing a back seal gas comprising Ar and hydrogen gas to flow over the inner surface of electrolytically polished pipe materials. FIG. 4(a) shows composition profiles in the direction of depth, as obtained by XPS, of surfaces at the upstream side of gas supply and at distances from the welded portion (hereinbelow, the upstream side of the welded portion is indicated by negative values) of −5 mm; in FIG. 4(b), −3 mm; in FIG. 4(c), 0 mm at the welded portion; in FIG. 4(d), of +3 mm; in FIG. 4(e), at +5 mm; and in FIG. 4(f), of +10 mm. Using these results, and focusing in particular on the amounts of Mn, it can be seen that Mn is deposited on the downstream side of the welded portion in increasing amounts along the downstream side, with the greatest value thereof being at +5 mm (FIG. 4(e)). It is clear from these results that the metal fumes which are melted by the welding are primarily carried in the back seal gas flow and are deposited along the downstream side of the welded portion.

When a corrosive gas is caused to flow along the inner surface of the stainless steel after welding, separation of the deposited metals is generated, and the results thereof will be stated below.

Hydrogen chloride gas containing a moisture concentration of approximately 1.4 ppm was enclosed for a period of 12 hours in an inner surface containing a welded portion, at a pressure of 2.5 Kg/cm$^2$, and thereinafter, Ar gas of super high purity was passed therethrough, and metal atoms generated from the surface including the welded portion were collected on a Si wafer and measured using TR-XRF (Total Reflection X-ray Fluorescence Spectrometry). The metals generated and the amounts generated are shown in FIG. 5. FIG. 5(a) shows a stainless steel inner surface subjected to electrolytic polishing which had 22 welded positions, while FIG. 5(b) shows a stainless steel inner surface having no welded portions. No metal component was detected on the surface shown in FIG. 5(b), which did not contain welded portions, so that these metals were below the detection threshold of TR-XRF, which is $1 \times 10^{10}$ Atm/cm$^2$. With respect to the surface shown in FIG. 5(a), which was subjected to welding, metals were detected in the following amounts: Fe, $2.4 \times 10^{14}$ Atm/cm$^2$, Cr, $6.5 \times 10^{11}$ Atm/cm$^2$, Ni, $2.3 \times 10^{13}$ Atm/cm$^2$, and Mn, $1.5 \times 10^{12}$ Atm/cm$^2$.

From these results, it can be seen that the separated metal atoms do not comprise merely Mn; rather, the chief components comprising the pipe materials are subject to separation. Identical results were obtained in valves possessing welded portions. The deposition of impurity metals on the interior surfaces possessing welded portions in fluid supply systems and in fluid parts was confirmed, and it was determined that these obstruct high performance device characteristics when introduced into semiconductor devices.

The present invention is based on the above view; it was discovered that considerable impurity removal effects can be achieved by washing with super high purity water after welding. A structural example explaining the installation method of the present invention shown in FIG. 1.

References 101 and 101' indicate welded pipes; commonly, electrolytically polished stainless steel pipes, or electrolytically polished stainless steel pipes having surfaces which are further subjected to passivation processing, are employed in fluid pipe systems of high purity. One end of welded pipe 101 is connected to a gas supply source 104 and a super high purity water supply source 105, via, for example, a coupler 103, such as a Swedgelock (brand name), and a 3-way valve 102.

First, while supplying an inert gas into the interior of the welded pipe from gas supply source 104 through 3-way valve 102, the pipes to be welded are welded by means of a common welding method, for example, tungsten inert gas arc welding, electron beam welding, laser beam welding, or the like. Next, 3-way valve 102 is switched, and a super high purity water at a temperature within a range of 20°–100° C. is introduced into the pipe for a period within a range of 10 minutes–4 hours, and is discharged outside the system via coupler 103'. Next, the 3-way valve 102 is again switched, and inert gas of high purity is introduced into the pipe from the gas supply source, the moisture component within the pipe is thus purged, and the pipe is desiccated.

The super high purity water of the present invention should have a resistivity of 18 MΩ·cm or greater, and furthermore, from the point of view of the washing effect and the prevention of the secondary contamination of the piping, the amount of dissolved metals should preferably be less than 100 ppt, and an amount of less than 1 ppt is further preferable.

By means of washing using this super high purity water, it is possible to completely remove the impurities such as fumes and the like which are generated during welding. Accordingly, if a gas supply system for semiconductor devices using halogen gas is constructed using pipe materials having such welded portions, there is no danger of the contamination of the semiconductor devices.

In the present invention, the fluid supply pipe and super high purity water supply pipe 108 and the fluid discharge pipe and super high purity water discharge pipe 107 need not be provided at the ends of the pipes, but rather may be provided at any point thereon. Furthermore, in the case in which a plurality of pipes are connected, washing may be conducted once per block after welding, or washing with super high purity water may be conducted once after the entire fluid supply system has been welded. In the case of long pipe systems, it is preferable that welding, washing, and desiccation be conducted per block, and a highly clean state of the piping after welding and installation be thus maintained.

In the above example, the welding of stainless steel pipes was discussed; however, the present invention is not limited thereto, and may be applied to the welding of other materials, or to the welding of couplers such as valves and the like.

BRIEF DESCRIPTION OF THE DRAWINGS

FIG. 2(a) An electrolytically polished SUS 316L pipe.

FIG. 2(b) An SUS 316L pipe which has first been electrolytically polished and then subjected to oxide passivation processing.

3(a) An electrolytically polished SUS 316L pipe.

3(b) An SUS 316L pipe which has first been electrolytically polished and then subjected to oxide passivation processing.

FIGS. 4(a)–4(f) are diagrams showing the relationship between the composition profile in the direction of depth of deposited metals in the vicinity of the welded portion of a stainless steel pipe, and the distance from the welded portion.

4(a) 5 mm to the upstream side.

4(b) 3 mm to the upstream side.

4(c) Welded portion.

4(d) 3 mm to the downstream side.

4(e) 5 mm to the downstream side.

4(f) 10 mm to the downstream side.

Figure 5A:
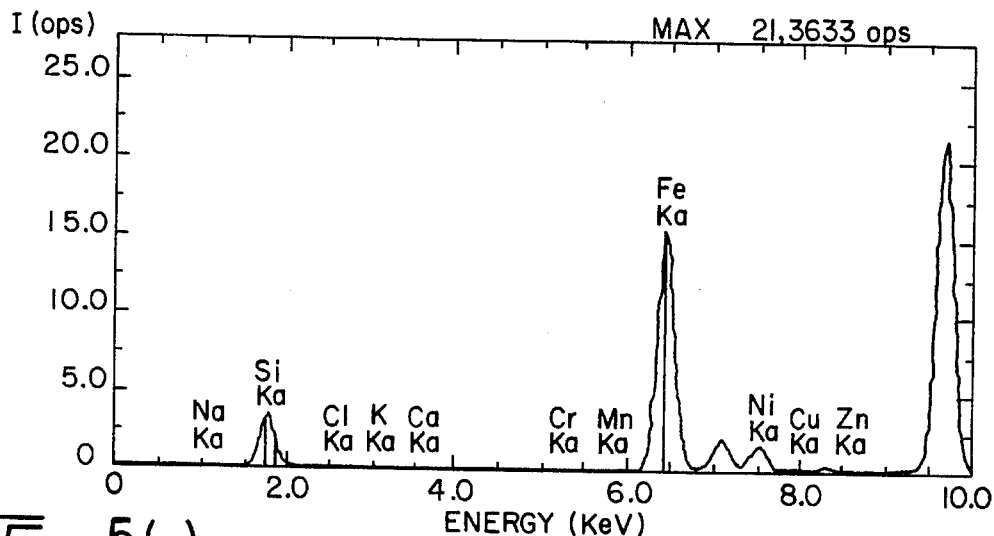
Figure 5B:
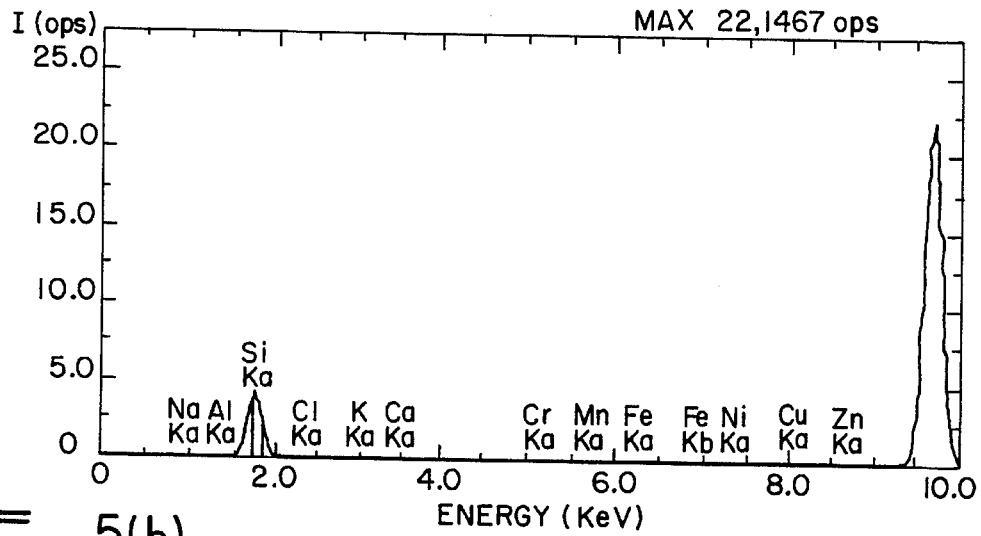
Figure 5C:
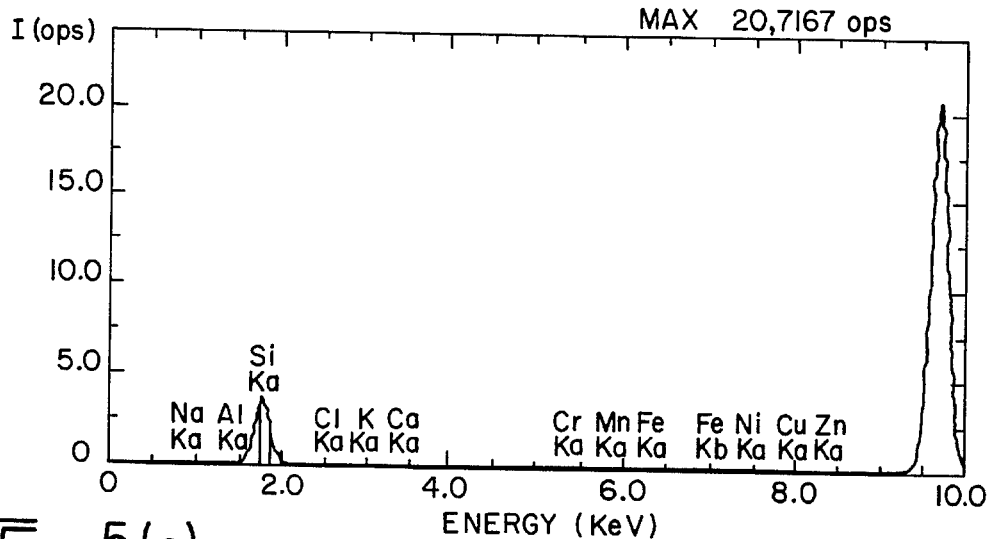

FIGS. 5(a)–5(c) show the TR-XRF spectrum of metallic elements released in the interior of the pipe.

5(a) A pipe after welding.

5(b) A pipe prior to welding,

5(c) A pipe washed with super high purity water after welding.

Figure 6A:
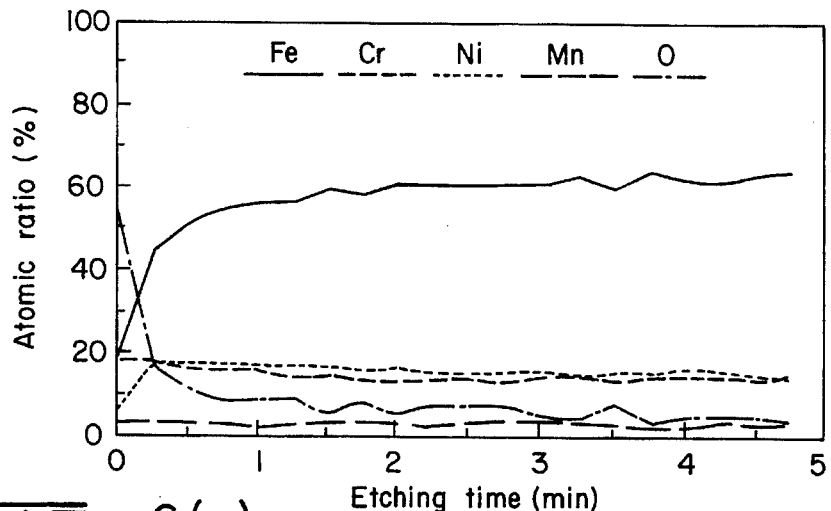
Figure 6B:
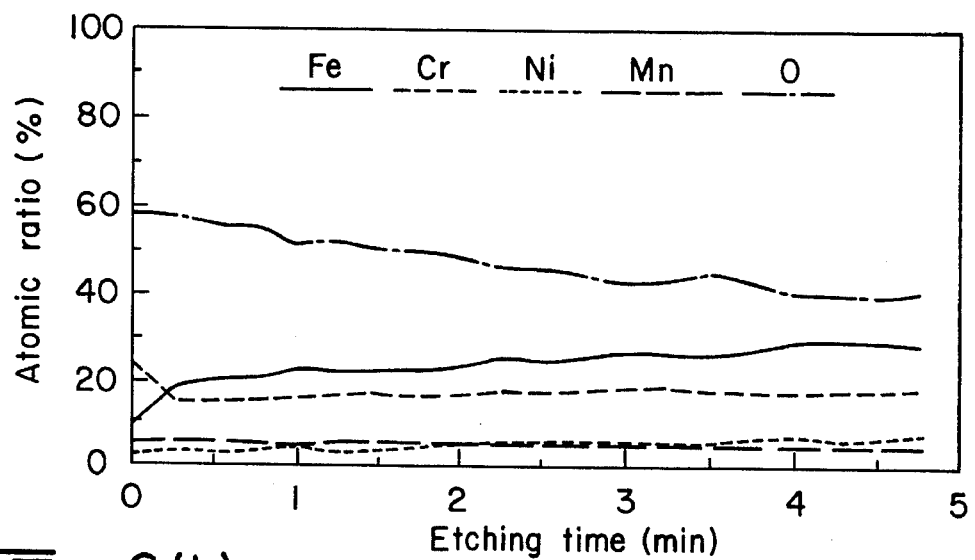
Figure 6C:
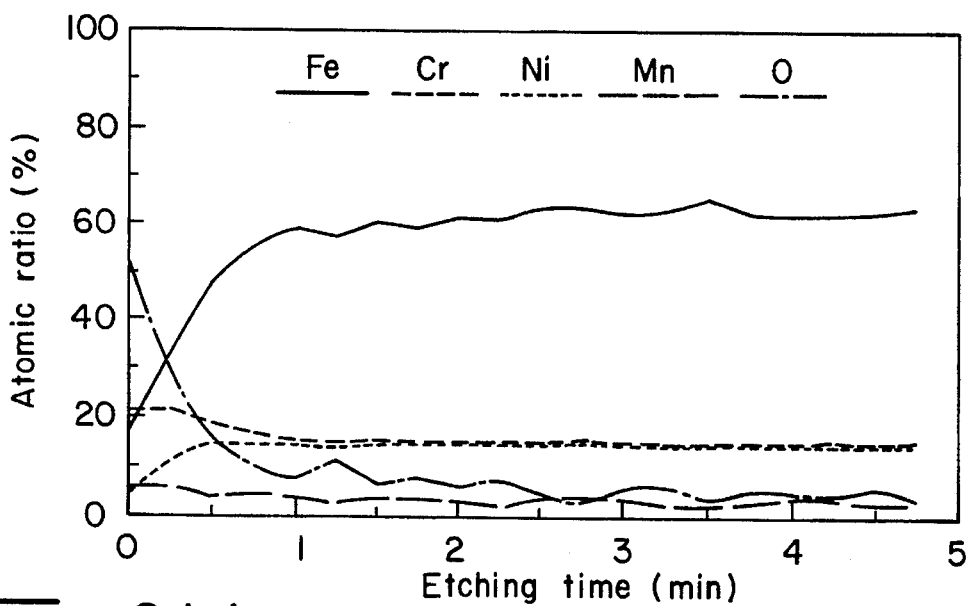

FIG. 6(a)–6(c) show composition profiles in the direction of depth of the interior of pipes after washing with super high purity water, as obtained by XPF.

6(a) 80° C.

6(b) 50° C.

6(c) 40° C.

Figure 7:
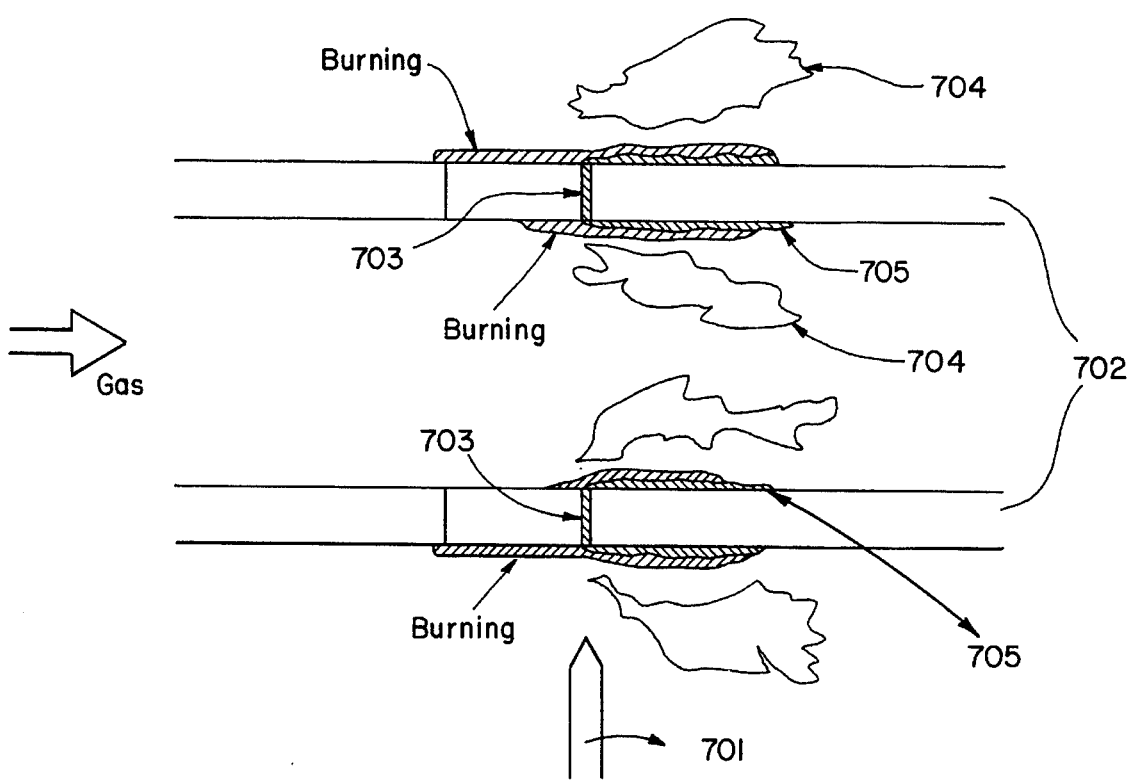

FIG. 7 shows a conventional installation method for a fluid supply pipe system.

References 101 and 101' indicate pipes to be welded,

Reference 102 indicates a 3-way valve,

References 103 and 103' indicate couplers,

Reference 104 indicates a gas supply source,

Reference 105 indicates a super high purity water supply source,

Reference 106 indicates a welded portion,

Reference 107 indicates a super high purity water discharge pipe,

Reference 108 indicates a super high purity water supply pipe,

Reference 701 indicates a tungsten electrode,

Reference 702 indicates a pipe to be welded,

Reference 703 indicates a welded portion,

Reference 704 indicates metal fumes, and

Reference 705 indicates deposited metal.

BEST MODE FOR CARRYING OUT THE INVENTION

Hereinbelow, the present invention will be explained through the use of embodiments.

Figure 1:
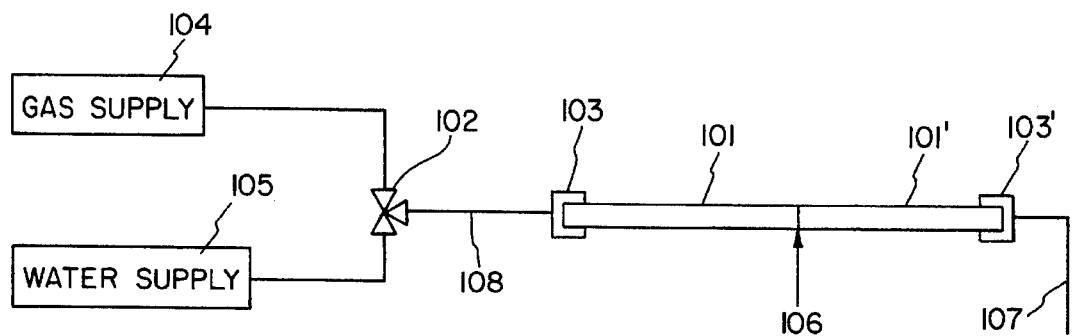
FIG. 1 is a drawing showing a structural example explaining the installation method of the present invention.

Using the apparatus having the structure depicted in FIG. 1, electrolytically polished ⅜ inch stainless steel pipes, and stainless steel pipes subjected to passivation processing, were welded by means of tungsten inert gas welding, and then super high purity water having various temperatures was caused to flow through the pipes for a period of 1 hour and at a flow rate of 250 cc/min, and the interior of the pipes was washed. Here, the amount of dissolved metals present in the super high purity water was 10 ppt, and the resistivity thereof was 18.2 MΩ·cm.

Figure 3A:
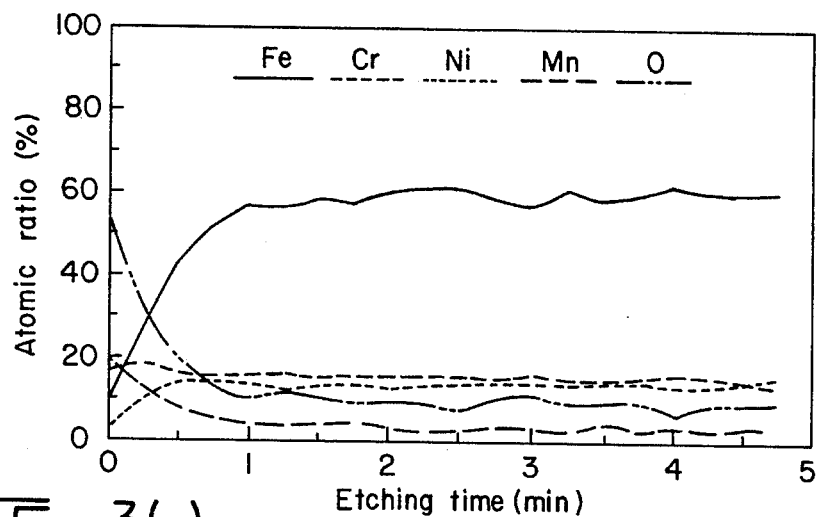
FIGS. 3(a) 3(b) are diagrams showing a composition profile in the direction of depth of the welded portion of a stainless steel pipe as obtained by XPS.
Figure 3B:
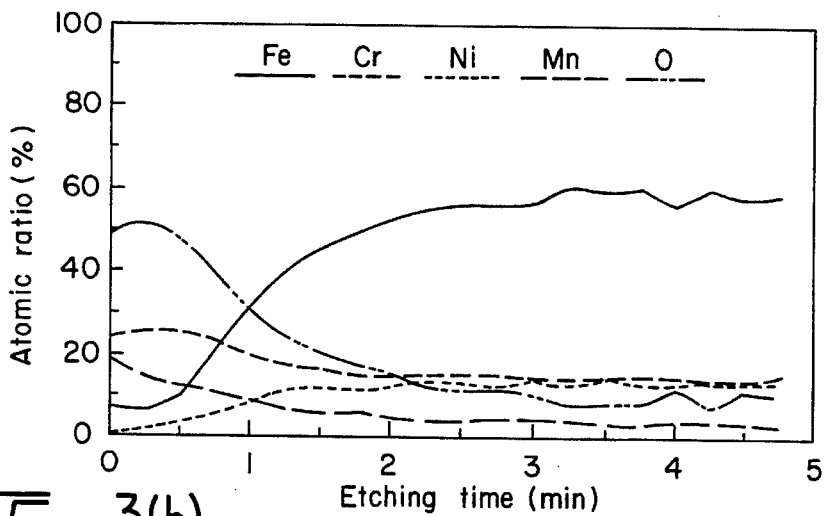
Figure 4A:
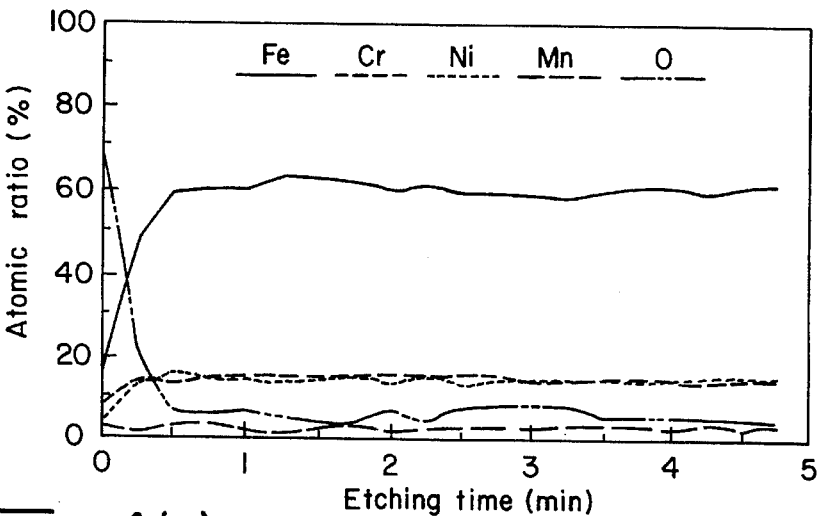
Figure 4B:
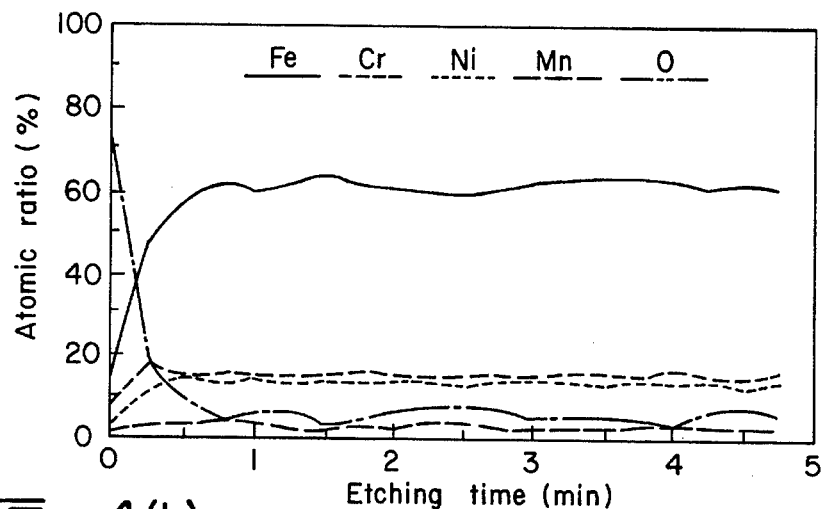
Figure 4C:
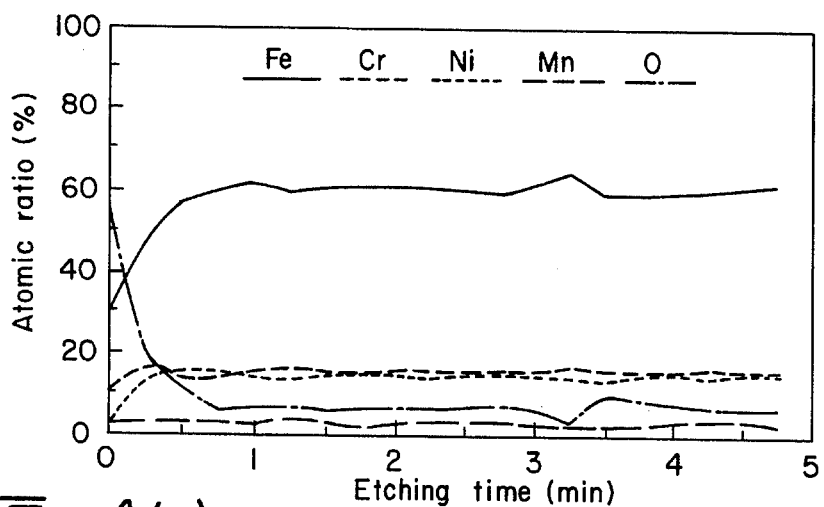
Figure 4D:
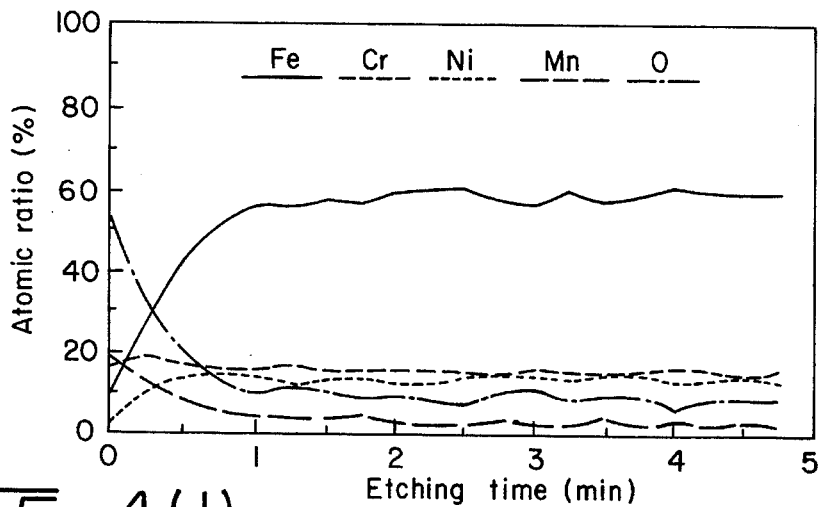
Figure 4E:
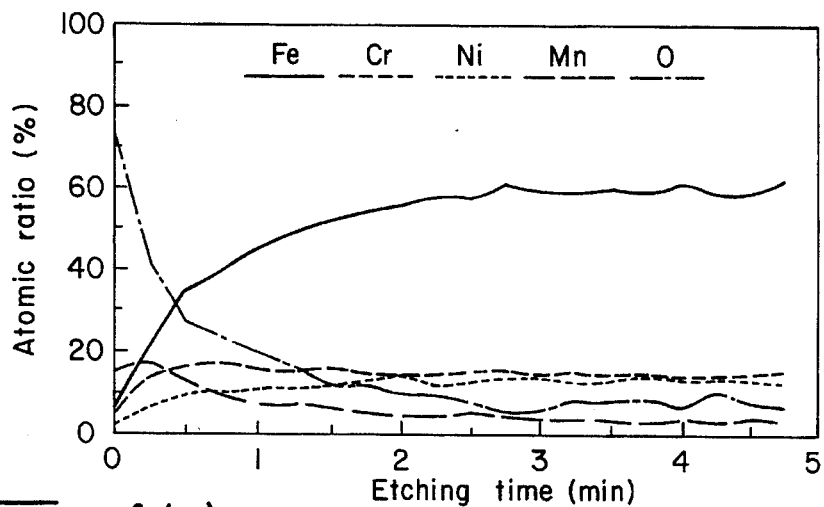
Figure 4F:
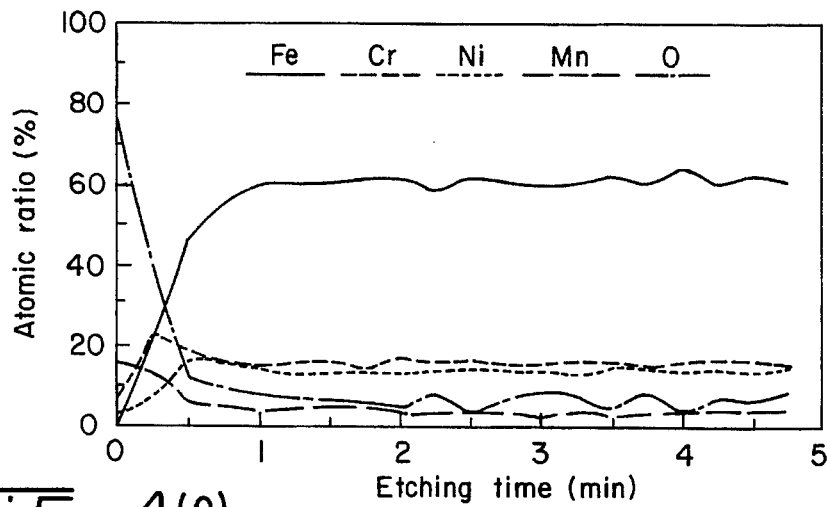

As is noted in FIG. 3, composition profiles in the direction of depth were taken of each surface welded portion after washing at each temperature, by means of XPS, at a position 5 mm downstream from the welded portion, at which the amounts of deposited metals were greatest. The results thereof are shown in FIG. 6. In the Figure, (a) shows a composition profile in the direction of depth, obtained by means of XPS, after washing with super high purity water at a temperature of 80° C., while (b) shows the case in which super high purity water at a temperature of 60° C. was used, and (c) shows the case in which super high purity water at a temperature of 40° C. was used.

Figure 2A:
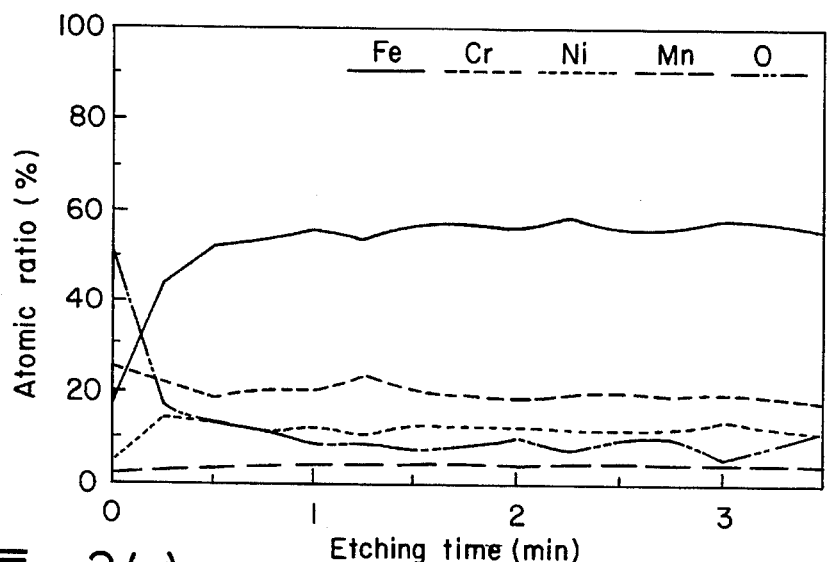
FIGS. 2(a), 2(b) are diagram showing a composition profile in the direction of depth of the inner surface of a stainless steel pipe as obtained by XPS.
Figure 2B:
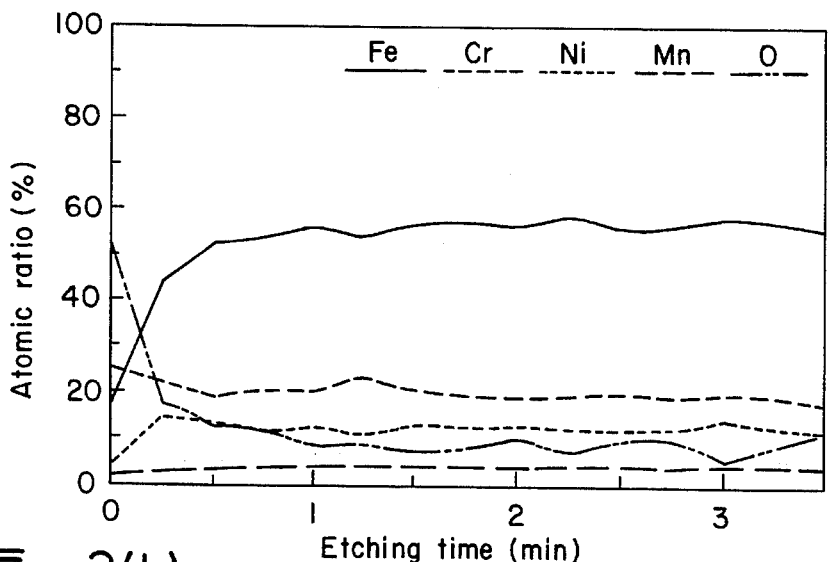

As is clear from the Figure, in accordance with the results at 80° C. and at 60° C., washing established a state of cleanliness essentially identical to that of the non-welded surface shown in FIG. 2. Furthermore, it can be seen from the results at 40° C. that in comparison with the case of a non-welded surface, slightly greater amounts of Mn remain at the outermost layer of the surface. Furthermore, it can be understood from the experiments in which the washing period was altered that at a temperature of 40° C., a washing period on the level of 3 hours is necessary.

Next, an electrolytically polished stainless steel tube was welded at 22 portions, and super high purity water having a temperature of 40° C. was caused to flow therethrough for a period of 3 hours at a flow rate of 250 cc/min, and then, in order to remove the moisture from the inner surface of the weld, an Ar gas of super high purity (a moisture concentration of 50 ppt) was caused to flow therethrough. A hydrogen chloride gas having a moisture concentration of approximately 1.4 ppm was introduced to the inner surface containing this welded portion from which moisture had been removed, for a period of approximately 12 hours and a pressure of 2.5 Kg/cm$^2$, and after this, Ar gas of super high purity was passed therethrough, and the metal elements released from the surface including the welded portion were collected on a Si water, and were measured by means of TR-XRF.

The released metals and the amounts thereof are shown in FIG. 5(c). In the same way as in the case of the surface shown in FIG. 5(b), which did not included a welded portion, the metals were present at amounts less than $1 \times 10^{10}$ Atm/cm$^2$, which is the lower limit of detection by means of TR-XRF, so that no metal components were detected.

INDUSTRIAL APPLICABILITY

As explained above, by means of the present invention, it is possible to completely remove metal fumes which are released from fused portions during welding and which are redeposited in the vicinity of the surface of the welded portion, so that it is possible to prevent the contamination of semiconductor devices by means of these deposited metals. As a result, it is possible to provide fluid supply systems for super clean devices, vacuum devices, and the like.

What is claimed is:

1. A method of interconnecting a plurality of pipe members by welding into a super high purity fluid supply pipe system, said method comprising:

welding two of said pipe members together while supplying an inert gas to one of said pipe members and discharging said inert gas from the other said pipe member;

after said welding operation supplying super pure water into said two pipe members and washing the interior of said two pipe members with said water, whereby metal particles deposited by fumes during said welding operation are removed.

2. A method of interconnecting a plurality of pipe members by welding into a super high purity fluid supply pipe system in accordance with claim 1 wherein said plurality of pipe members are connected by welding in a predetermined order, and, when said entire super high purity fluid supply pipe system has been completed, causing super high purity water to flow from a fluid supply source output port through said fluid supply pipe system whereby metal particles deposited by fumes during said welding operation and which adhere to the interior surfaces of said super high purity fluid supply pipes are washed out.

3. A method of interconnecting a plurality of pipe members by welding into a super high purity fluid supply pipe system in accordance with claim 2, wherein said inert gas comprises Ar gas or N gas.

4. A method of interconnecting a plurality of pipe members by welding into a super high purity fluid supply pipe system in accordance with claim 2, wherein after washing of said pipe members, moisture adhering to the components is removed by means of nitrogen gas.

5. A method of interconnecting a plurality of pipe members by welding into a super high purity fluid supply pipe system in accordance with claim 2, wherein said super high purity water has a resistivity of 18 MΩ·cm or greater, and contains an amount of metal of less than 100 ppt.

6. An installation method for super high purity fluid supply pipe systems in accordance with claim 1 wherein said inert gas comprises Ar gas on N gas.

7. A method of interconnecting a plurality of pipe members by welding into a high purity fluid supply pipe system in accordance with claim 6, wherein after washing of said pipe members, moisture adhering to the pipe members is removed by means of nitrogen gas.

8. A method of interconnecting a plurality of pipe members by welding into a super high purity fluid supply pipe system in accordance with claim 6, wherein said super high purity water has a resistivity of 18 MΩ·cm or greater, and contains an amount of metal of less than 100 ppt.

9. A method of interconnecting a plurality of pipe members by welding into a super high purity fluid supply pipe system in accordance with claim 1 wherein after washing of said pipe members, moisture adhering to the pipe members is removed by means of nitrogen gas.

10. A method of interconnecting a plurality of pipe members by welding into a super high purity fluid supply pipe system in accordance with claim 9, wherein said super high purity water has a resistivity of 18 MΩ·cm or greater, and contains an amount of metal of less than 100 ppt.

11. A method of interconnecting a plurality of pipe members by welding into a purity fluid supply pipe system in accordance with claim 1 wherein said super high purity water has a resistivity of 18 MΩ·cm or greater, and contains an amount of metal of less than 100 ppt.

12. An installation method for super high purity fluid supply pipe systems including the step of welding components of said system and the step of washing welded components of said system with super high purity water, whereby metal particles deposited by fumes during said welding operation and which adhere to the interior of said components are washed out.

13. An installation method for super high purity fluid supply pipe systems in accordance with claim 12, wherein after washing of said components, moisture adhering to the components is removed by means of nitrogen gas.

14. An installation method for super high purity fluid supply pipe systems in accordance with claim 12, wherein said super high purity water has a resistivity of 18 MΩ·cm or greater, and contains an amount of metal of less than 100 ppt.

15. A super high purity fluid supply pipe system made according to the method of interconnecting a plurality of fluid supply pipe system components by welding, wherein the method comprises a step of washing said fluid supply pipe system components with super high purity water to remove metal particles deposited by fumes during the welding of said components.

16. A super high purity fluid supply system in accordance with claim 15, wherein said super high purity fluid supply system includes a halogen gas supply.

17. A super high purity fluid supply pipe system in accordance with claim 16, wherein said super high purity water has a resistivity of 18 MΩ·cm or greater, and contains an amount of metal of less than 100 ppt.

18. A super high purity fluid supply pipe system in accordance with claim 15 wherein said super high purity water has a resistivity of 18 MΩ·cm or greater, and contains an amount of metal of less than 100 ppt.

* * * * *